United States Patent
Agarwal et al.

(10) Patent No.: US 9,634,976 B2
(45) Date of Patent: Apr. 25, 2017

(54) SYSTEMS AND METHODS FOR ORGANIZING THE DISPLAY OF MESSAGES

(71) Applicant: GOOGLE INC., Mountain View, CA (US)

(72) Inventors: Shalini Agarwal, San Francisco, CA (US); Clarence Yung, San Francisco, CA (US); Thijs Van As, Zurich (CH); Han Seul Lee, Redwood City, CA (US); Victor-bogdan Anchidin, Baden (CH)

(73) Assignee: Google Inc., Mountain View, CA (US)

( * ) Notice: Subject to any disclaimer, the term of this patent is extended or adjusted under 35 U.S.C. 154(b) by 307 days.

(21) Appl. No.: 14/473,584

(22) Filed: Aug. 29, 2014

(65) Prior Publication Data

US 2016/0065521 A1   Mar. 3, 2016

(51) Int. Cl.
  *G06F 3/048* (2013.01)
  *H04L 12/58* (2006.01)
  *G06F 3/0484* (2013.01)

(52) U.S. Cl.
  CPC .......... *H04L 51/18* (2013.01); *G06F 3/04842* (2013.01); *G06F 3/04847* (2013.01); *H04L 51/16* (2013.01); *H04L 51/22* (2013.01)

(58) Field of Classification Search
  CPC ...... G06Q 10/02; G06Q 10/025; G06Q 50/12; G06Q 50/14; G06Q 30/02–30/0261; G06Q 30/06; G06Q 50/01; G06F 3/0481–3/0488; G06F 17/2705–17/30902; G06F 3/048; G06F 17/30864–17/0867
  See application file for complete search history.

(56) References Cited

U.S. PATENT DOCUMENTS

| | | | |
|---|---|---|---|
| 7,925,540 B1 | 4/2011 | Orttung et al. | |
| 8,484,140 B2 | 7/2013 | Thompson et al. | |
| 2003/0208315 A1* | 11/2003 | Mays | G01C 21/3647 701/431 |
| 2005/0216464 A1 | 9/2005 | Toyama et al. | |
| 2007/0112606 A1 | 5/2007 | Deljo | |
| 2009/0012824 A1* | 1/2009 | Brockway | G06Q 10/02 705/6 |
| 2011/0225257 A1* | 9/2011 | Tilden | G06Q 10/107 709/207 |
| 2013/0238727 A1 | 9/2013 | Martinez et al. | |
| 2015/0113443 A1* | 4/2015 | Breger | G06F 3/04817 715/753 |

\* cited by examiner

*Primary Examiner* — Claudia Dragoescu
(74) *Attorney, Agent, or Firm* — Morgan, Lewis & Bockius LLP

(57) ABSTRACT

A method of processing messages executes at a computing device having one or more processors and memory. The memory stores one or more programs for execution by the one or more processors. Upon identification of a message subset in the plurality of messages pertaining to an event of a first event type or a first entity, an action associated with the message subset is executed thereby obtaining content from a data source distinct from the messages. A graphic compilation is formatted for display in the user in-box of a messaging application. A first portion of the compilation comprises the distinct data source content, a second portion of the compilation lists event items associated with the event or first entity extracted from the message subset, and a third portion of the compilation lists a plurality of objects, each of which is a synopsis of a message in the message subset.

18 Claims, 9 Drawing Sheets

US 9,634,976 B2

SYSTEMS AND METHODS FOR ORGANIZING THE DISPLAY OF MESSAGES

TECHNICAL FIELD

The disclosure relates generally to processing electronic messages, and more specifically to organizing, for display, disparate information associated with an event type or entity.

BACKGROUND

Electronic messaging applications, such as email, convey various types of information to a recipient such as messages to and from others. In conventional messaging applications, it is not always possible to ascertain the relative importance of each message in an incoming box without first reviewing their full content. Moreover, even for relatively important messages, it is often necessary to open the message, and then review their full content, in order to derive necessary or useful information. Thus, a recipient of messages falls into a recurring pattern of not only checking for new messages, but also manually opening each message to obtain needed or useful information. Moreover, even when a particular message is important, the information in the message may only contain a portion of what is needed for the user. For instance, a particular message may include information regarding an airline reservation, while another seemingly unrelated message may include information regarding a hotel reservation, and still another message may include information regarding a car reservation. However, closer inspection of these messages may reveal that they are all associated with a particular trip (event) the user is about to take, or has taken. If the user is interested in reviewing the details of this trip, multiple messages need to identified, opened and reviewed. This is tedious, time consuming, and inconvenient. Additional examples of where this arises in any situation in which disparate messages provide information on a particular event (e.g., trip, task, home modeling project involving several subcontractors, etc.) or a particular entity (service provider, merchant, etc.). Accordingly, what are needed in the art are systems and methods for assisting a recipient with obtaining useful information from messages more quickly and with fewer manual operations and better ways of organizing this information for the user.

SUMMARY

Disclosed implementations address the above deficiencies and other problems associated with reviewing messages. In the present application, upon identification of a message subset in the plurality of messages pertaining to an event of a first event type (e.g., a trip) or a first entity (e.g., a particular pharmacy), an action associated with the message subset is executed thereby obtaining content from a data source distinct from the messages (e.g., retrieval of a stock "hero" image for the first event type or first entity). A graphic compilation is formatted for display in the user in-box of a messaging application. A first portion of the compilation comprises the distinct data source content (e.g., the stock "hero" image), a second portion of the compilation lists a plurality of event items associated with the event or first entity extracted from the message subset (e.g., extracted details of individual car, hotel, and plane reservations of a trip), and a third portion of the compilation lists a plurality of objects, each of which is a synopsis of a message in the message subset.

In accordance with some implementations, a method of displaying information executes at a computing device having one or more processors and memory. The memory stores one or more programs configured for execution by the one or more processors. A plurality of messages, addressed to a user, is analyzed to determine whether a subset of messages in the plurality of messages pertains to an event of a certain event type or pertains to a certain entity. Upon identification of the subset of messages in the plurality of messages pertaining to the event of the certain event type or to the first entity, a method is performed. In this method an action is associated with the first subset of messages is executed thereby obtaining content from a first data source that is distinct from the plurality of messages and that is associated with the event of the certain event type or the first entity. For instance, a stock "hero" image of the certain event type or the first entity is retrieved. Also, a plurality of event items associated with the event of the first event type or the first entity is extracted from the first subset of messages (e.g., in the case of a trip, car reservations, hotel reservations, etc.). Further, there is formatted for display in the in-box of a messaging application associated with the user, a single graphic compilation that represents the event of the first event type or the first entity. A first discrete portion of the single graphic compilation comprises the content from the first data source. A second discrete portion of the single graphic compilation comprises a listing of the event items in the plurality of event items. A third discrete portion of the single graphic compilation comprises a listing of a plurality of objects. Each object in the plurality of objects is a synopsis of a respective message in the first subset of messages. In some embodiments, the single graphic compilation is sent to a remote client device associated with the user for display in the in-box of the messaging application associated with the user.

In some embodiments, the content is a picture or a video and executing the action associated with the first subset of messages comprises retrieving the picture or a frame of the video. In some embodiments, the certain event type or the certain entity is one of a plurality of predefined event types or one of a plurality of predefined entities. In such instances, the analyzing of the plurality of messages comprises analyzing the plurality of messages for an event that corresponds to at least one of the plurality of predefined event types or an entity that corresponds to at least one of the plurality of predefined entities. In this way, in some instances, multiple subsets of message are found in the plurality of messages. For example, in some embodiments, the analyzing the plurality of messages identifies a first subset of messages in the plurality of message that pertains to the a first event type of the plurality of predefined event types and identifies a second subset of messages in the plurality of message that pertains to a second event type of the plurality of predefined event types. In some embodiments, the first and second subset of message have a least one common message. In some embodiments, the first and second subsets of message have no messages in common. In some embodiments, each event type in the plurality of predefined event types is associated with a different picture in a plurality of pictures, and the content obtained from the first data source is the picture associated with the certain event type. In some embodiments, each entity in the plurality of predefined entities is associated with a different picture in a plurality of pictures, and the content obtained from the first data source is the picture associated with the entity identified for the subset of messages.

In some embodiments the listing of the event items (in the single graphic compilation) is in a chronological order derived from the first subset of messages, where the chronological order is independent of a chronological order that the messages in the subset of messages were sent to the user. This is useful in situations where the messages pertain to event dates that occur during, for example, a trip. In such instances, it is desirable to list the events in the order of the trip rather than in the order the messages pertaining to the trip were sent to a user. As an example, if a first message regarding a hotel reservation at the end of a trip is sent to a user before a second message regarding a hotel reservation at the beginning of a trip, it is useful to order the hotel reservation at the beginning of the trip before the hotel reservation at the end of the trip even though this is the reverse chronological order relative to the message send dates.

In some embodiments, each event item in the plurality of event items is characterized by a class in a plurality of classes. Further, each class in the plurality of classes is associated with a respective first graphic in a first plurality of graphics. In such embodiments, the formatting for display additionally comprises executing formatting instructions that cause the listing of the event items to include, for each respective event item in the plurality of event items, the respective first graphic associated with the respective event item adjacent to the respective event item. Further, in some such embodiments, each message in the first subset of messages is characterized by a category in a plurality of categories. Each category in the plurality of categories is associated with a respective second graphic in a second plurality of graphics. In such embodiments, the formatting for display further comprises executing formatting instructions that cause the listing of the plurality of objects to include, for each respective object in the plurality of objects, the respective second graphic associated with the message category of the message for which the respective object provides a synopsis, adjacent to the respective object.

In some embodiments, each respective event item in the plurality of event items includes an event date or time associated with the event item that is retrieved from a message in the subset of messages, where the event date or time is independent of a date message in the subset of messages were sent to the user or received by the user.

In some embodiments, the subset of messages pertains to an event of a first event type, where the first event type is a trip and a first event item in the plurality of event items is a first flight associated with the trip and a second event item in the plurality of event items is a hotel reservation associated with the trip.

In some embodiments, the method further comprises providing instructions to toggle a respective event item in the listing of event items between a collapsed state and an expanded state, where the expanded state of the respective items provides more information about the respective item than the collapsed state of the respective item.

Another aspect of the present disclosure provides a computing device comprising one or more processors, memory, and one or more programs stored in the memory. The one or more programs are configured for execution by the one or more processors. The one or more programs comprise instructions for analyzing a plurality of messages, addressed to a user, to determine whether a subset of messages in the plurality of messages pertains to an event of a certain event type or pertains to a certain entity. Upon identification of the subset of messages in the plurality of messages pertaining to the event of the certain event type or to the first entity, a method is performed. In this method an action is associated with the first subset of messages is executed thereby obtaining content from a first data source that is distinct from the plurality of messages and that is associated with the event of the certain event type or the first entity. For instance, a stock "hero" image of the certain event type or the first entity is retrieved. Also, a plurality of event items associated with the event of the first event type or the first entity is extracted from the first subset of messages (e.g., in the case of a trip, car reservations, hotel reservations, etc.). Further, there is formatted for display in the in-box of a messaging application associated with the user, a single graphic compilation that represents the event of the first event type or the first entity. A first discrete portion of the single graphic compilation comprises the content from the first data source. A second discrete portion of the single graphic compilation comprises a listing of the event items in the plurality of event items. A third discrete portion of the single graphic compilation comprises a listing of a plurality of objects. Each object in the plurality of objects is a synopsis of a respective message in the first subset of messages. In some embodiments, the single graphic compilation is sent to a remote client device associated with the user for display in the in-box of the messaging application associated with the user.

Another aspect of the present disclosure provides a non-transitory computer readable storage medium storing one or more programs configured for execution by a computing device having one or more processors and memory. The one or more programs comprise instructions for analyzing a plurality of messages, addressed to a user, to determine whether a subset of messages in the plurality of messages pertains to an event of a certain event type or pertains to a certain entity. Upon identification of the subset of messages in the plurality of messages pertaining to the event of the certain event type or to the first entity, a method is performed. In this method an action is associated with the first subset of messages is executed thereby obtaining content from a first data source that is distinct from the plurality of messages and that is associated with the event of the certain event type or the first entity. For instance, a stock "hero" image of the certain event type or the first entity is retrieved. Also, a plurality of event items associated with the event of the first event type or the first entity is extracted from the first subset of messages (e.g., in the case of a trip, car reservations, hotel reservations, etc.). Further, there is formatted for display in the in-box of a messaging application associated with the user, a single graphic compilation that represents the event of the first event type or the first entity. A first discrete portion of the single graphic compilation comprises the content from the first data source. A second discrete portion of the single graphic compilation comprises a listing of the event items in the plurality of event items. A third discrete portion of the single graphic compilation comprises a listing of a plurality of objects. Each object in the plurality of objects is a synopsis of a respective message in the first subset of messages. In some embodiments, the single graphic compilation is sent to a remote client device associated with the user for display in the in-box of the messaging application associated with the user.

BRIEF DESCRIPTION OF THE DRAWINGS

For a better understanding of the aforementioned implementations of the invention as well as additional implementations thereof, reference should be made to the Description of Implementations below, in conjunction with the following drawings in which like reference numerals refer to corresponding parts throughout the figures.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Figure 1:
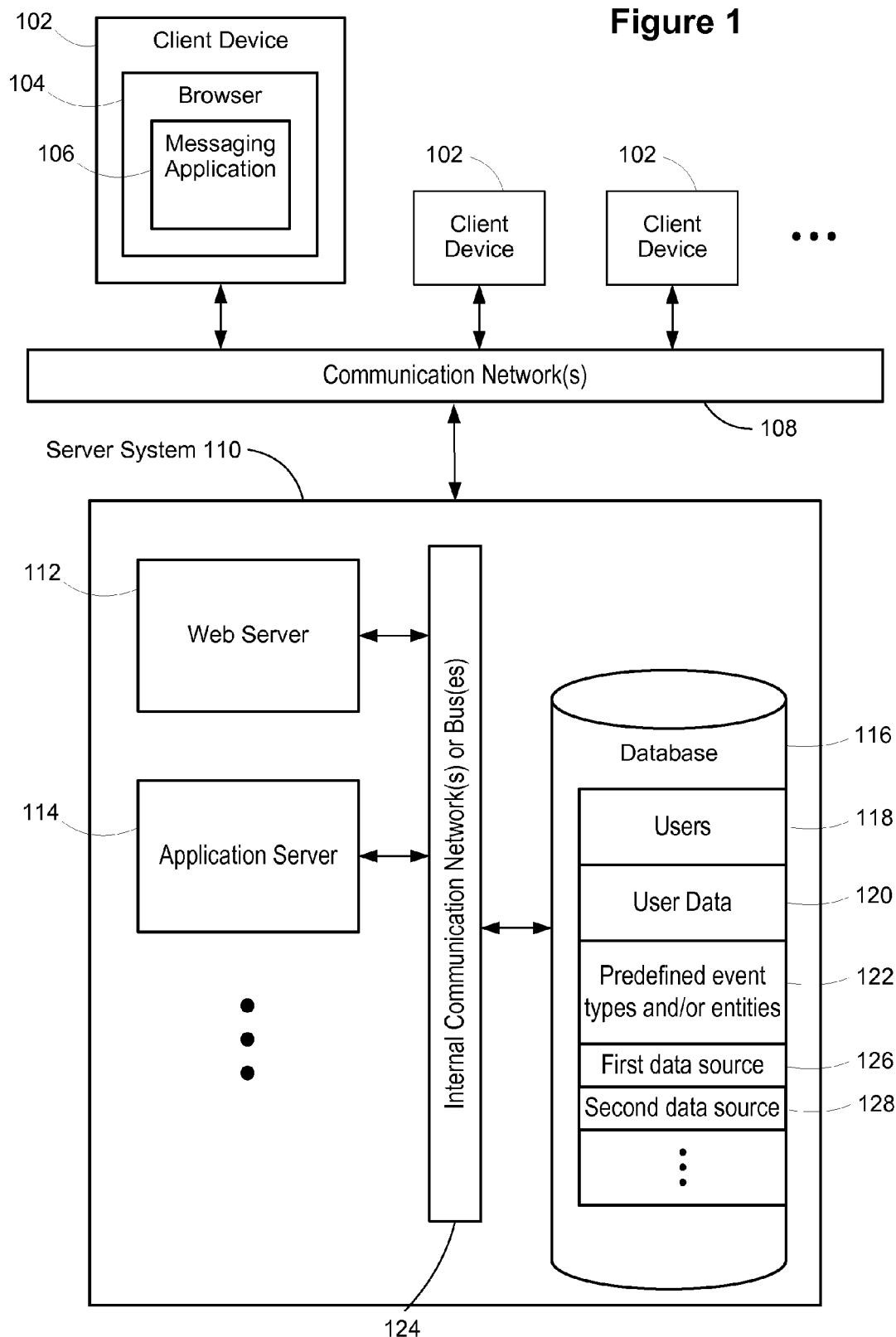
FIG. 1 illustrates a context in which some implementations operate.

FIG. 1 is a block diagram that illustrates the major components of some implementations. The various client devices 102 (also identified herein as computing devices) and servers 300 in a server system 110 communicate over one or more networks 108 (such as the Internet). In various embodiments, a client device 102 is a smart phone, a tablet computer, a laptop computer, a mobile computing device, a computing device of a vehicle of a user (e.g., an in-vehicle communications system, an in-vehicle entertainment system, an in-vehicle navigation system), a wearable apparatus of the user that includes a computing device (e.g., a watch of the user having a computing device, glasses of the user having a computing device, a wearable music player), desktop computer, or other computing device that has access to a communication network 108 and can run an electronic messaging application 106. In some implementations, the messaging application runs within a web browser 104.

In some implementations, the server system 110 consists of a single server 300. More commonly, the server system 110 includes a plurality of servers 300. In some implementations, the servers 300 are connected by an internal communication network of bus 124. The server system 110 includes one or more web servers 112, which receive requests from users (e.g., from client devices 102) and return appropriate information, resources, links, and so on. In some implementations, the server system 110 includes one or more application servers 114, which provide various applications, such as a messaging application 106. The server system 110 typically includes one or more databases 116, which store information such as web pages, a user list 118, various user information 120 (e.g., user names and encrypted passwords, user preferences, and so on), a plurality of predefined event types and/or predefined entities 122, first data source 126 and second data source 128.

Figure 2:
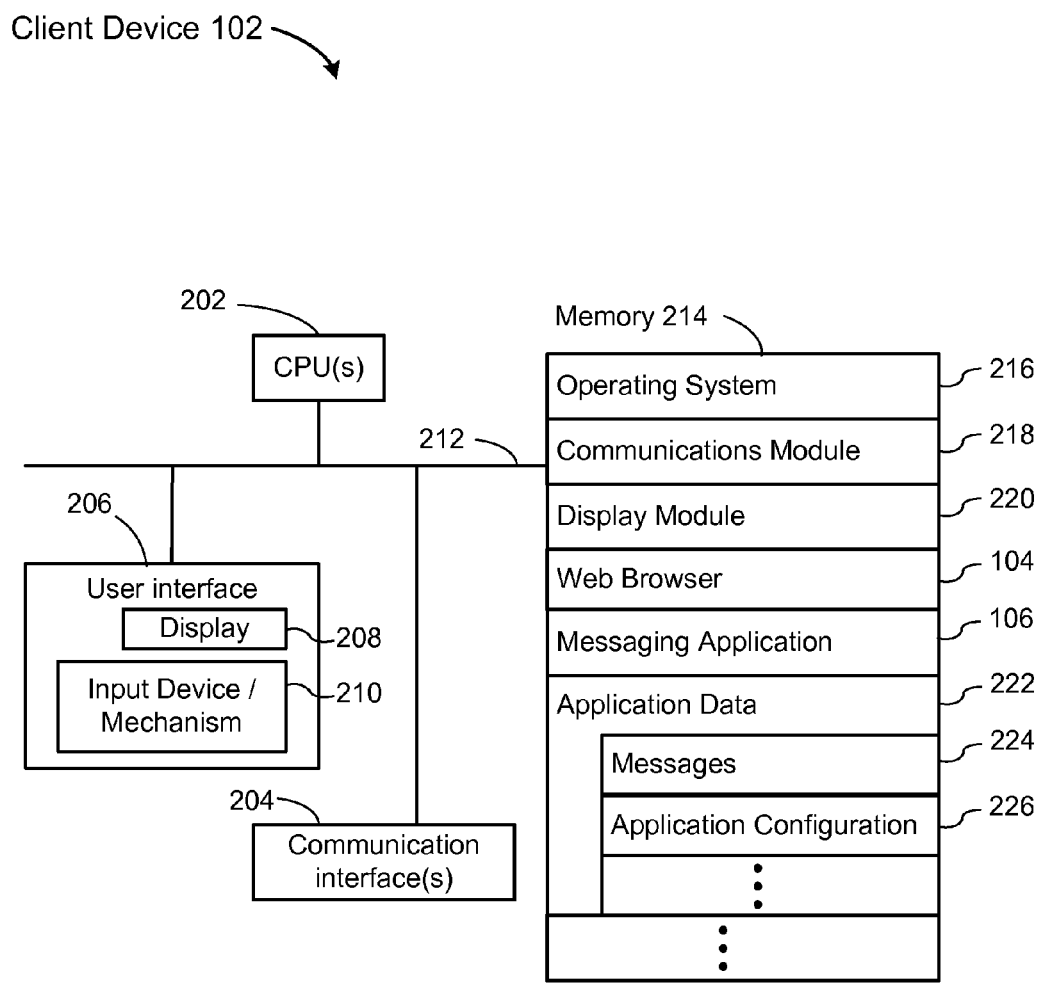
FIG. 2 is a block diagram of a client computing device according to some implementations.

FIG. 2 is a block diagram illustrating a client device 102 that a user uses to access a messaging application 106. A client device is also referred to as a computing device, which may be a tablet computer, a laptop computer, a smart phone, a desktop computer, a PDA, or other computing device than can run an electronic messaging application 106 and has access to a communication network 108. A client device 102 typically includes one or more processing units (CPUs) 202 for executing modules, programs, or instructions stored in memory 214 and thereby performing processing operations; one or more network or other communications interfaces 204; memory 214; and one or more communication buses 212 for interconnecting these components. In some embodiments, the communication buses 212 include circuitry (sometimes called a chipset) that interconnects and controls communications between system components. A client device 102 includes a user interface 206 comprising a display device 208 and one or more input devices or mechanisms 210. In some implementations, the input device/mechanism includes a keyboard and a mouse; in some implementations, the input device/mechanism includes a "soft" keyboard, which is displayed as needed on the display device 208, enabling a user to "press keys" that appear on the display 208.

In some implementations, the memory 214 includes high-speed random access memory, such as DRAM, SRAM, DDR RAM or other random access solid state memory devices. In some implementations, memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternately the non-volatile memory device(s) within memory 214, comprises a non-transitory computer readable storage medium. In some implementations, the memory 214, or the computer readable storage medium of memory 214, stores the following programs, modules, and data structures, or a subset thereof:

- an operating system 216, which includes procedures for handling various basic system services and for performing hardware dependent tasks;
- a communications module 218, which is used for connecting the client device 102 to other computers and devices via the one or more communication network interfaces 204 (wired or wireless) and one or more communication networks 108, such as the Internet, other wide area networks, local area networks, metropolitan area networks, and so on;
- a display module 220, which receives input from the one or more input devices 210, and generates user interface elements for display on the display device 208;
- a web browser 104, which enables a user to communicate over a network 108 (such as the Internet) with remote computers or devices;
- a messaging application 106, which enables the user to send and receive electronic messages. In some implementations, the messaging application is an email application. In some implementations, the messaging application is an instant messaging application. In some implementations, the messaging application 106 runs within the web browser 104 as illustrated in FIG. 1. In some implementations, the messaging application 106 runs independently of a web browser 104 (e.g., a desktop application). An example of an electronic messaging application is illustrated below in FIGS. 4A-4C; and
- application data 222, which is used by the messaging application 106. The application data comprises messages 224 (e.g., email messages or instant messages). In some embodiments, the application data 222 includes application configuration data 226, such as user preferences, user history, geographic information about the user, or the state of configuration options, and/or predefined event types or entities defined by the user.

Each of the above identified executable modules, applications, or sets of procedures may be stored in one or more of the previously mentioned memory devices and corresponds to a set of instructions for performing a function described above. The above identified modules or programs (e.g., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, in some embodiments, the memory 214 stores additional modules or data structures not described above.

Although FIG. 2 shows a client device 102, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
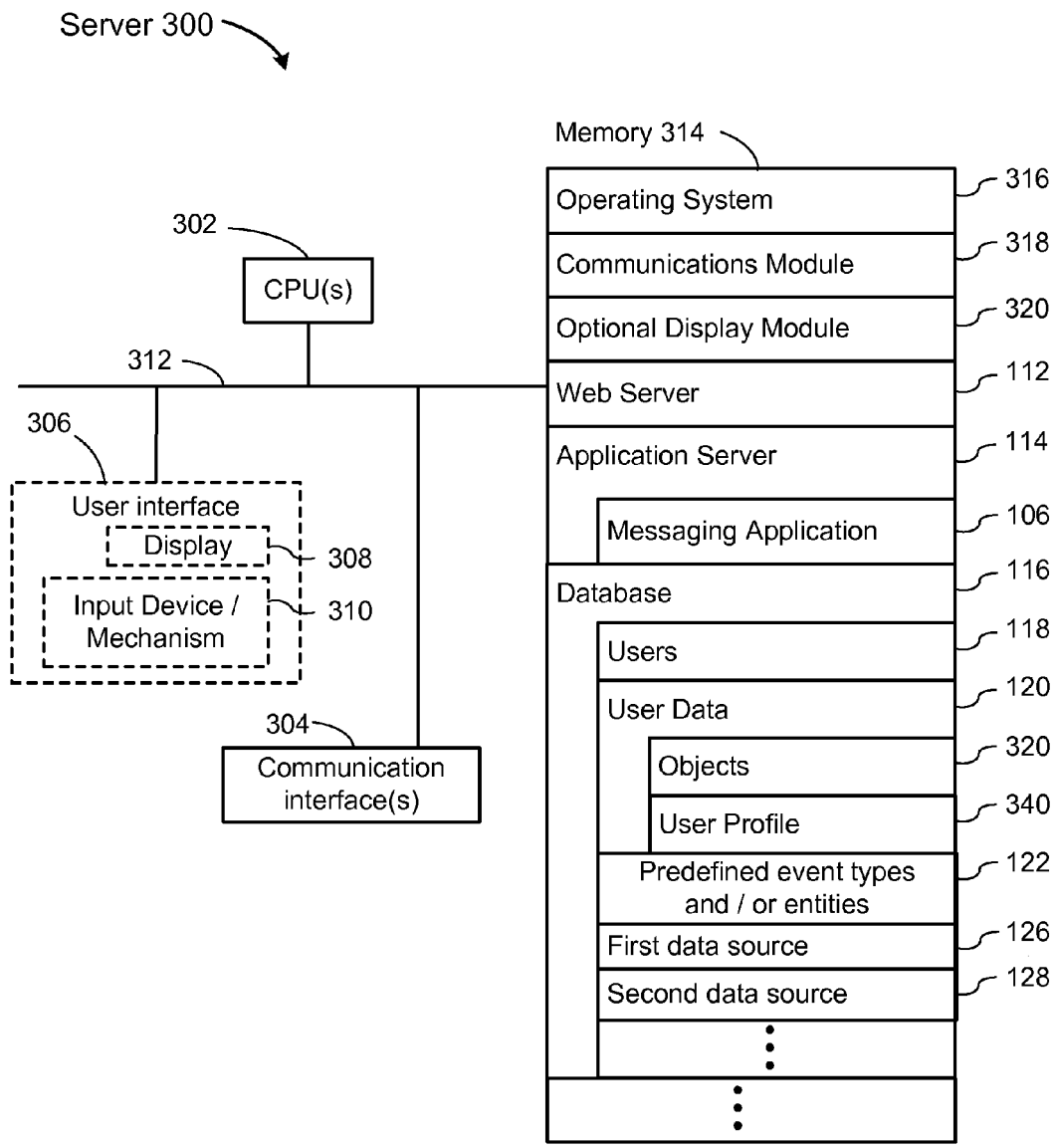
FIG. 3 is a block diagram of a server according to some implementations.

FIG. 3 is a block diagram illustrating a server 300 that is used in a server system 110 in accordance with some embodiments. A typical server system includes many individual servers 300, which, in some instances, number in the hundreds or thousands. A server 300 typically includes one or more processing units (CPUs) 302 for executing modules, programs, or instructions stored in the memory 314 and thereby performing processing operations; one or more network or other communications interfaces 304; memory 314; and one or more communication buses 312 for interconnecting these components. In some embodiments, the communication buses 312 include circuitry (sometimes called a chipset) that interconnects and controls communications between system components. In some implementations, a server 300 includes a user interface 306, which may include a display device 308 and one or more input devices 310, such as a keyboard and a mouse.

In some implementations, the memory 314 includes high-speed random access memory, such as DRAM, SRAM, DDR RAM or other random access solid state memory devices. In some implementations, the memory 314 includes non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternately the non-volatile memory device(s) within memory 314, comprises a non-transitory computer readable storage medium. In some implementations, the memory 314, or the computer readable storage medium of memory 314, stores the following programs, modules, and data structures, or a subset thereof:

- an operating system 316, which includes procedures for handling various basic system services and for performing hardware dependent tasks;
- a communications module 318, which is used for connecting the server 300 to other computers via the one or more communication network interfaces 304 (wired or wireless), an internal network or bus 124, or other communication networks 108, such as the Internet, other wide area networks, local area networks, metropolitan area networks, and so on;
- an optional display module 320, which receives input from one or more input devices 310, and generates user interface elements for display on a display device 308;
- one or more web servers 112, which receive requests from client device 102, and returns responsive web pages, resources, or links. In some implementations, each request is logged in the database 116;
- one or more application servers 114, which provide various applications (such as an email or other electronic messaging application) to client devices 102. In some instances, applications are provided as a set of web pages, which are delivered to client devices 102 and displayed in a web browser 104. The web pages are delivered as needed or requested. In some instances, an application is delivered to a client device 102 as a download, which is installed and run from the client device 102 outside of a web browser 104;
- one or more databases 116, which store various data used by the modules or programs identified above. In some implementations, the database 116 includes a list of authorized users 118 (e.g., including user names, encrypted passwords, and other relevant information about each user). The database 116 also stores user specific data 120 that is used by one or more of the applications provided by the application server. For example, some implementations store the electronic messages 224 for each user. For example, some implementations store objects 320 for each user. As another example, some implementations store user profiles 340 associated with users. In some implementations, the database 116 includes predefined event types and/or predefined entities 122. In some implementations, the database 116 includes first data source 126 and second data source 128.

It will be appreciated that FIGS. 2 and 3 collectively represent the server 300 and the client device 102 as including predefined event types and/or predefined entities (e.g., predefined event types and/or predefined entities 122). In some implementations, only the server 300 stores predefined event types and/or predefined entities. In some implementations, only the client device 102 stores predefined event types and/or predefined entities. In some implementations, both the server 300 and the client device 102 store predefined event types and/or predefined entities. In some such implementations, the server 300 and the client device 102 store the same predefined event types and/or predefined entities. In some such implementations, the server 300 stores a first set of predefined event types and/or predefined entities and the client device 102 stores a second set of predefined event types and/or predefined entities, and there is no overlap between the first set of predefined event types and/or predefined entities and the second set of predefined event types and/or predefined entities, partial overlap between the first set of predefined event types and/or predefined entities and the second set of predefined event types and/or predefined entities, or complete overlap between the first set of predefined event types and/or predefined entities and the second set of predefined event types and/or predefined entities. In one embodiment, the first set of predefined event types and/or predefined entities is defined by a source distinct from the user, and the second set of predefined event types and/or predefined entities is defined by a particular user associated with a particular client device 102.

Each of the above identified elements in FIG. 3 may be stored in one or more of the previously mentioned memory devices. Each executable program, module, or procedure corresponds to a set of instructions for performing a function described above. The above identified modules or programs (e.g., sets of instructions) need not be implemented as separate software programs, procedures or modules, and thus various subsets of these modules are combined or otherwise re-arranged in various implementations. In some implementations, the memory 314 stores a subset of the modules and data structures identified above. Furthermore, in some embodiments, the memory 314 stores additional modules or data structures not described above.

Although FIG. 3 illustrates a server 300, FIG. 3 is intended more as functional illustration of the various features that may be present in a set of one or more servers rather than as a structural schematic of the implementations described herein. In practice, and as recognized by those of ordinary skill in the art, items shown separately could be combined and some items could be separated. The actual number of servers used to implement these features, and how features are allocated among them, will vary from one implementation to another, and depends in part on the amount of data traffic that the system must handle during peak usage periods as well as during average usage periods.

As illustrated in FIGS. 2 and 3, the functionality for an electronic messaging application may be shared between a client device 102 and a server system 110. In some implementations, after the electronic messaging application is installed on a client device 102, the majority of the subsequent processing occurs on the client device. In other implementations, the majority of the processing and data storage occurs at a server 300, and the client device 102 uses a web browser 104 to view and interact with the data. One of skill in the art recognizes that various allocations of functionality between the client device 102 and the server system 110 are possible, and some implementations support multiple configurations (e.g., based on user selection).

Figure 4A:
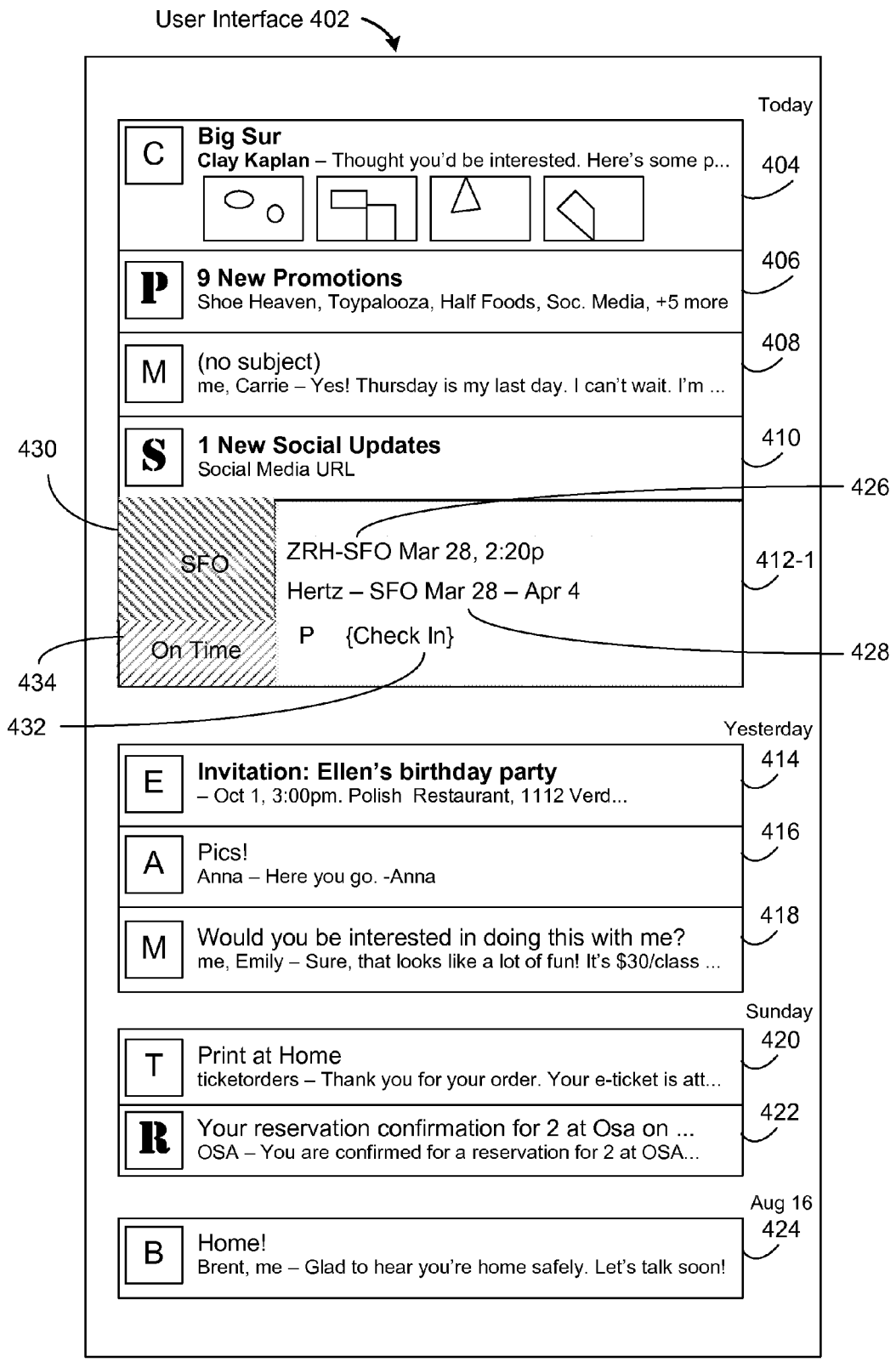
FIGS. 4A-4C illustrate aspects of a user interface providing multiple display states for objects representing messages in accordance with some implementations.

FIG. 4A illustrates features of a messaging application that provide multiple display states for objects representing messages in accordance with some implementations. FIG. 4A illustrates user interface 402, which is displayed as part of a messaging application (e.g., an email application). User interface depicts a plurality of objects in a list format. In this example, each row in the list represents a separate object. Examples of objects include messages, (e.g., messages 404, 408, and 414-424) and message clusters (e.g., 406, 410). Other forms of objects are possible too, such as tasks. The objects are all for a user associated with the user interface 402. In some embodiments, individual messages (e.g., messages 404, 408, and 414-424) are message threads, message conversations, or messages that are addressed to one or more users, including the user uniquely associated with the user interface 402.

In FIG. 4A, the user interface 402 is, in particular, shown to comprise three objects that are message clusters, clusters 406, cluster 410, and cluster 412, which is represented by display state 412-1. Cluster 406 is a group of electronic messages having a collective association, namely promotional material (e.g., advertisements for retail sales, newsletters from stores). As can be seen in FIG. 4A, cluster 406 comprises nine new electronic messages, and cluster 410 comprises one new electronic message. In some embodiments, a new electronic message refers to a message that has not been viewed, opened, acknowledged or read by the user of the electronic messaging application. Message clusters are disclosed further in U.S. patent application Ser. No. 14/145,005, entitled "Systems and Methods for Throttling Display of Electronic Messages," filed Dec. 31, 2013, and U.S. patent application Ser. No. 14/139,205, entitled "Systems and Methods for Clustering Electronic Messages," filed Dec. 23, 2013, each of which is hereby incorporated by reference herein in its entirety.

Continuing to refer to FIG. 4A, a method of organizing information is shown in greater detail with reference to a single graphic compilation 412, which represents another form of cluster. Single graphic compilation 412 is the outcome of a process in which a plurality of messages (not necessarily shown in FIG. 4A), addressed to a user, were analyzed to determine whether a subset of messages in the plurality of messages pertains to an event of a certain predetermined event type or pertains to a certain predetermined entity. Upon identification of the first subset of messages in the plurality of messages pertaining to the event of the certain predetermined type or to the first entity, an action associated with the subset of messages is executed, thereby obtaining content 430 from a first data source 126 that is distinct from the plurality of messages and that is associated with the event of the certain predetermined event type or the first entity. In particular, with reference to FIG. 4A, the certain first predetermined event type is "travel", and the event is, namely, a trip to San Francisco. A plurality of event items associated with the event type is extracted from the subset of messages relating to this trip. In the case of a travel event, such event items include things such as hotel reservations, airline reservations, car reservations, meetings, and tasks relating to the trip. Then, there is formatted for display in the in-box of a messaging application associated with the user a single graphic compilation that represents the event of the first event type or the first entity. In some embodiments, this single graphic compilation has a collapsed state and an expanded state. FIG. 4A illustrates an exemplary collapsed state, denoted state 412-1. In this exemplary collapsed state 412-1, there is information regarding a flight 426 associated with the trip from one message in the subset of messages represented by the single graphic compilation 412. There is also car reservation information 428 from another message in the subset of messages represented by the object. In some embodiments, some of the flight information 426 is obtained from a message in the subset of messages, and some of the information is obtained from a source distinct from the messages. For instance, in some embodiments, the flight destination is from the message but the departure time is from a source distinct from the message, such as a data source that tracks current times. Also illustrated in the collapsed state 412-1 of the single graphic compilation 412 is an indication 434 of whether the flight to SFO is on time. This information is typically obtained from, or derived from, the information in a data source that is distinct from the message. Also illustrated in the collapsed state 412-1 of the single graphic compilation 412 is a hero image 430 for the trip. Typically, the hero image is obtained from a source independent of the messages in the subset of messages, such as first data source 126 or second data source 128.

In some instances, a task is also inferred from one or more message in the subset of messages and is added to the collapsed state 412-1 of the single graphic compilation 412. Ways to infer a task from a message are disclosed in U.S. patent application Ser. No. 14/161,368, entitled "Identifying Tasks in Messages," filed Jan. 22, 2014, which is hereby incorporated by reference herein in its entirety. In some embodiments a message is processed in order to determine whether the message includes a task by determining, for each respective predefined candidate task in a plurality of predefined tasks, whether there is a match between the predefined candidate task and all or a portion of the respective message. In some embodiments, this match between the predefined candidate task and all or a portion of the respective message includes natural language processing of the all or a portion of the respective message as disclosed in U.S. patent application Ser. No. 14/161,368, entitled "Identifying Tasks in Messages," filed Jan. 22, 2014, which is hereby incorporated by reference herein in its entirety. In some embodiments, each predefined candidate task is a rule, heuristic, phrase, or other expression that is matched or applied against respective messages addressed to a user (e.g., the incoming message) to see if there is a match between the predefined candidate task and all or a portion of the respective message. In some embodiments, a predefined candidate task in the plurality of candidate tasks is from a source other than (external to, independent of) the user. For instance, in some embodiments there is a library of standard or common predefined candidate task formats that are provided for matching. When a match is deemed to have been found, the task derived from the corresponding message is included in the single graphic compilation 412. For instance, the check-in task 432 of the single graphic compilation 412. When the user clicks on or otherwise selects task affordance 432, information on how to check in to a flight referenced in the single graphic compilation 412, or a URL for checking into the flight referenced in the single graphic compilation 412 is provided. In some embodiments such tasks are shown in the expanded state 412-2 of the single graphic compilation 412.

Responsive to user selection of the single graphic compilation 412, user initiated toggling of the display state of the single graphic compilation 412 between the collapsed display state (412-1) and an expanded display state (412-2) is facilitated. FIG. 4A illustrates the collapsed display state 412-1 of the single graphic compilation 412 and FIG. 4B illustrates the expanded display state 412-2 of the single graphic compilation 412.

Figure 4B:
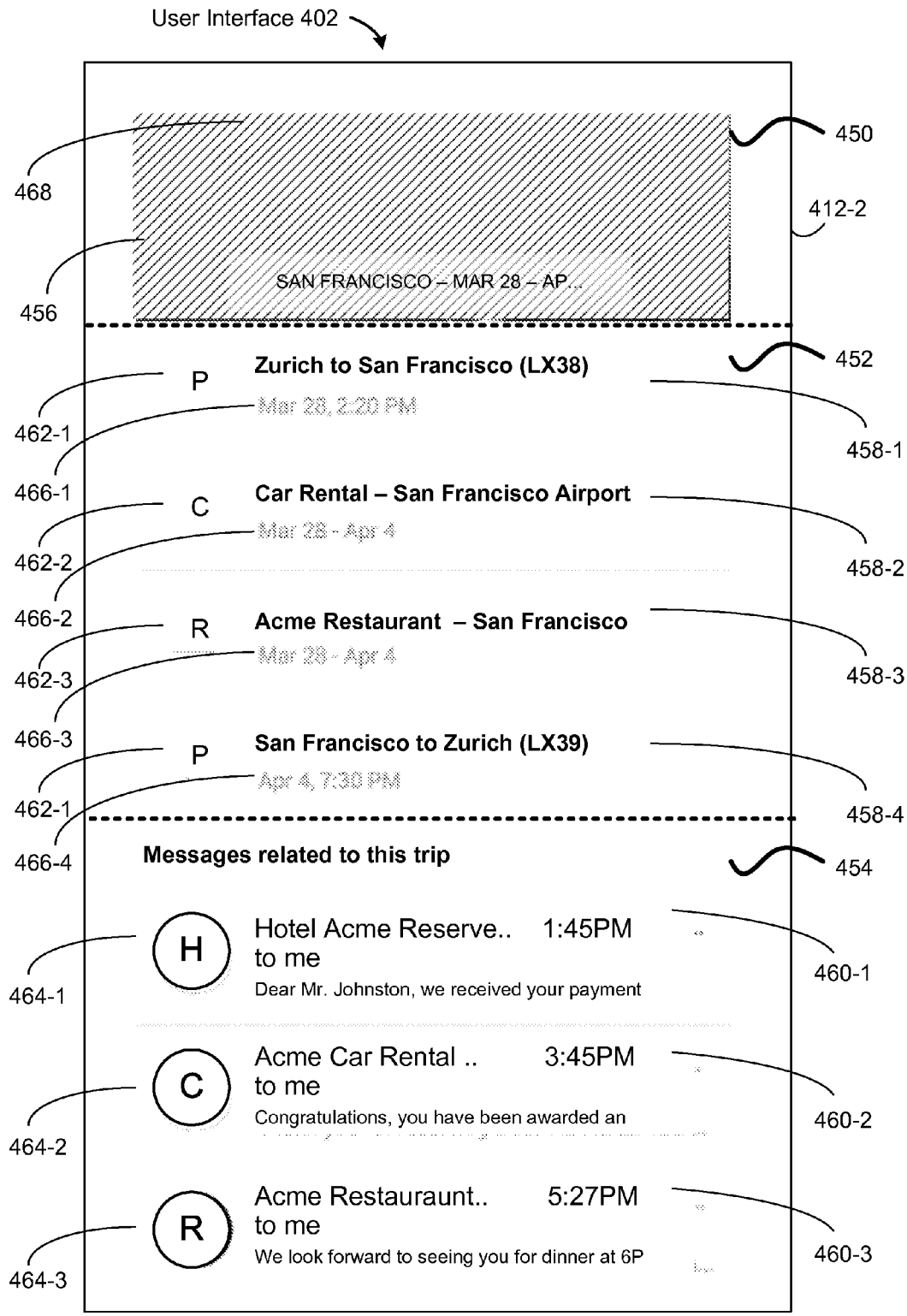

Turning to FIG. 4B, the expanded display state 412-2 of the single graphic compilation 412 includes a first discrete portion 450 which comprises content 456 from a first data source 126. In some embodiments content 456 is a picture or a video obtained by executing an action associated with the first subset of messages that comprises retrieving the picture or a frame of the video (e.g., from a source distinct from the first subset of messages, such as first data source 126 and/or second data source 128). In the example of FIG. 4B the content 456 from a first data source 126 is an image of the golden gate bridge that was retrieved from first data source 126 on the basis that the graphic compilation represents a trip to San Francisco.

The expanded display state 412-2 of the single graphic compilation 412 includes a second discrete portion 452 comprising a listing of the event items 458 in the plurality of event items. The event items 458 are associated with the event (e.g., the trip to San Francisco as in FIG. 4B) and are extracted from the first subset of messages. In some embodiments, the listing of the event items 458 is in a chronological order derived from the first subset of messages, where the chronological order is independent of a chronological order that the messages in the first subset of messages were sent to the user. For example, turning to FIG. 4B, in some embodiments, event items 458-1, 458-2, 458-3 and 458-4 are listed in the second discrete portion based on the order of dates associated with these event items and not by the transmittal date/time of the messages in the subset of messages from which these event items were obtained. The utility of this is illustrated by way of example, in which a first message regarding a hotel reservation at the end of a trip is sent to a user before a second message regarding a hotel reservation at the beginning of a trip. In such a situation it is useful to order the event item 458 regarding the hotel reservation at the beginning of the trip before the event item 458 regarding the hotel reservation at the end of the trip even though this is the reverse chronological order relative to the message send dates of the messages from which these event items were retrieved.

Continuing to refer to FIG. 4B, in some embodiments, each event item 458 in the plurality of event items is characterized by a class in a plurality of classes. Each class in the plurality of classes is associated with a respective first graphic 462 in a first plurality of graphics. Furthermore, the formatting for display of the single graphic compilation 412 comprises executing formatting instructions that cause the listing of the event items 458 to include, for each respective event item in the plurality of event items, the respective first graphic 462 associated with the respective event item 458 adjacent to the respective event item 458. For example, event items 458-1 and 458-4 are both in the class "airline reservation." Accordingly, the respective graphic 462 associated with airline reservations, graphic 462-1 is formatted to be adjacent to the respective event items 458-1 and 458-4. Event item 458-2 is in the class "car rental." Accordingly, the respective graphic 462 associated with car rentals, graphic 462-2 is formatted to be adjacent to the respective event item 458-2. Event item 458-3 is in the class "restaurant reservation." Accordingly, the respective graphic 462 associated with restaurant reservation, graphic 462-3 is formatted to be adjacent to the respective event item 458-3.

Continuing to refer to FIG. 4B, in some embodiments each respective event item 458 includes an event date and/or time 466 associated with the event item 458 that is retrieved from a corresponding message in the subset of messages. Such event date and/or times 466 are independent of the date the corresponding messages in the subset of messages were sent to the user or received by the user. For instance, event 458-1, with date 466-1, is ordered based on date 466-1 in the list of events rather than the date that the message that included event 458-1 was sent to the user.

The expanded display state 412-2 of the single graphic compilation 412 also includes a third discrete portion 454 of the single graphic compilation 412 that comprises a listing of a plurality of objects, where each object 460 in the plurality of objects is a synopsis of a respective message in the first subset of messages that has been identified as related to the event (e.g., the trip to San Francisco as in FIG. 4B). In some embodiments, each message in the first subset of messages is characterized by a category in a plurality of categories. Further, each category in the plurality of categories is associated with a respective second graphic in a second plurality of graphics. In such embodiments, the formatting the single graphic compilation for display further comprises executing formatting instructions that cause the listing of the plurality of objects to include, for each respective object 460 in the plurality of objects, the respective second graphic 464 associated with the message category of the message for which the respective object provides a synopsis, adjacent to the respective object. For example, message 460-1 is in the message category "airline reservation." Accordingly, the respective second graphic 464 associated with the message category airline reservations, graphic 464-1, is formatted to be adjacent to message 460-1. Message 460-2 is in the message category "car rental." Accordingly, the respective second graphic 464 associated with the message category car rentals, graphic 464-2, is formatted to be adjacent to the message 460-2. Message 460-3 is in the message category "restaurant reservation." Accordingly, the respective second graphic 464 associated with restaurant reservation, graphic 464-3, is formatted to be adjacent to the respective message 460-3.

In some embodiments, the expanded display state 412-2 of the single graphic compilation 412 of FIG. 4B is reached by selection of any point within the display space occupied by the collapsed display state 412-1 of the single graphic compilation 412 in FIG. 4A other than optional task affordance 432. In some embodiments, special action, such as swiping or double clicking or tapping within the screen area occupied by the collapsed display state 412-1 of the single graphic compilation 412 is performed to reach the expanded display state 412-2 of the single graphic compilation 412. In some embodiments the expanded display state 412-2 of the single graphic compilation 412 is reached by selection of hero image 430 of the collapsed display state 412-1 of the single graphic compilation illustrated in FIG. 4A. In some embodiments, the collapsed display state 412-2 of the single graphic compilation 412 is reached by selection of a designated "expand" affordance that is not shown in the collapsed display state 412-1 of the single graphic compilation 412 illustrated in FIG. 4A. In some embodiments, the single graphic compilation 412 does not have a collapsed display state 412-1 and only has the expanded display state 412-2 depicted in FIG. 4B.

Turning once again to FIG. 4B it is seen that, responsive to user selection of the collapsed display state 412-1 of the single graphic compilation 412, for example by any of the ways described above, the collapsed display state 412-2 of the single graphic compilation 412 is replaced with the expanded state 412-2 of the single graphic compilation 412 by pushing any objects in the list of objects that are above the single graphic compilation 412 (e.g., objects 404, 406, 408, and 410) up and pushing any objects in the list of objects that are below the single graphic compilation 412 (e.g., objects 414, 416, 418, 420, 422, and 424) down. In alternative embodiments, the expanded display state 412-2 of the single graphic compilation 412 occupies the entire portion of user interface 402 that is devoted to listing messages and tasks, such that no other messages or tasks are listed when the expanded state 412-2 of the single graphic compilation 412 is displayed.

In some embodiments, the collapsed display state 412-1 of the single graphic compilation 412 (FIG. 4A), is reached from the expanded display state 412-2 of the single graphic compilation 412 of FIG. 4B by selection of any point within the display space occupied by the expanded display state 412-2 of the single graphic compilation 412 in FIG. 4B other than events items 458 or objects 460. In some embodiments, special action, such as swiping or double clicking or tapping within the expanded display state 412-2 of the single graphic compilation 412 is performed to reach the collapsed display state 412-1 of FIG. 4A. In some embodiments, it is reached by selection of hero image 456 of FIG. 4B. In some embodiments it is reached by selection of a designated "collapse" affordance that is not shown in FIG. 4B. Responsive to user designated selection to return to the collapsed state 412-1, the expanded state 412-2 of the single graphic compilation 412 is once again replaced with the original collapsed state 412-1 of the single graphic compilation by pushing any objects in the list of objects that are above object 412 (e.g., objects 404, 406, 408, and 410) down and pushing any objects in the list of objects that are below object 412 (e.g., objects 414, 416, 418, 420, 422, and 424) up in the user interface.

In some embodiments, the plurality of messages that is includes some messages that have already been displayed to the user in the user interface and some messages that have not.

In some embodiments the plurality of messages are analyzed to determine if there exists a subset of messages within the plurality of messages that pertains to any one of a plurality of different event types or predefined entities. In some such embodiments, the analyzing the plurality of messages identifies a first subset of messages in the plurality of message that pertains to a first event type of the plurality of predefined event types and identifies a second subset of messages in the plurality of message that pertains to a second event type of the plurality of predefined event types. In some embodiments, each event type in the plurality of predefined event types is associated with a different picture in a plurality of pictures, and the content obtained from the first data source 126 is the picture associated with the first event type. For example, in the case of FIG. 4B, the event type is "trip to San Francisco" and the content 456 obtained from the first data source 126 is a picture of San Francisco. In some embodiments, the date and name of the event is grafted onto the content as notice 468 as illustrated in FIG. 4B. In some embodiments, each entity in the plurality of predefined entities is associated with a different picture in a plurality of pictures, and the content obtained from the first data source is the picture associated with the first entity.

Figure 4C:
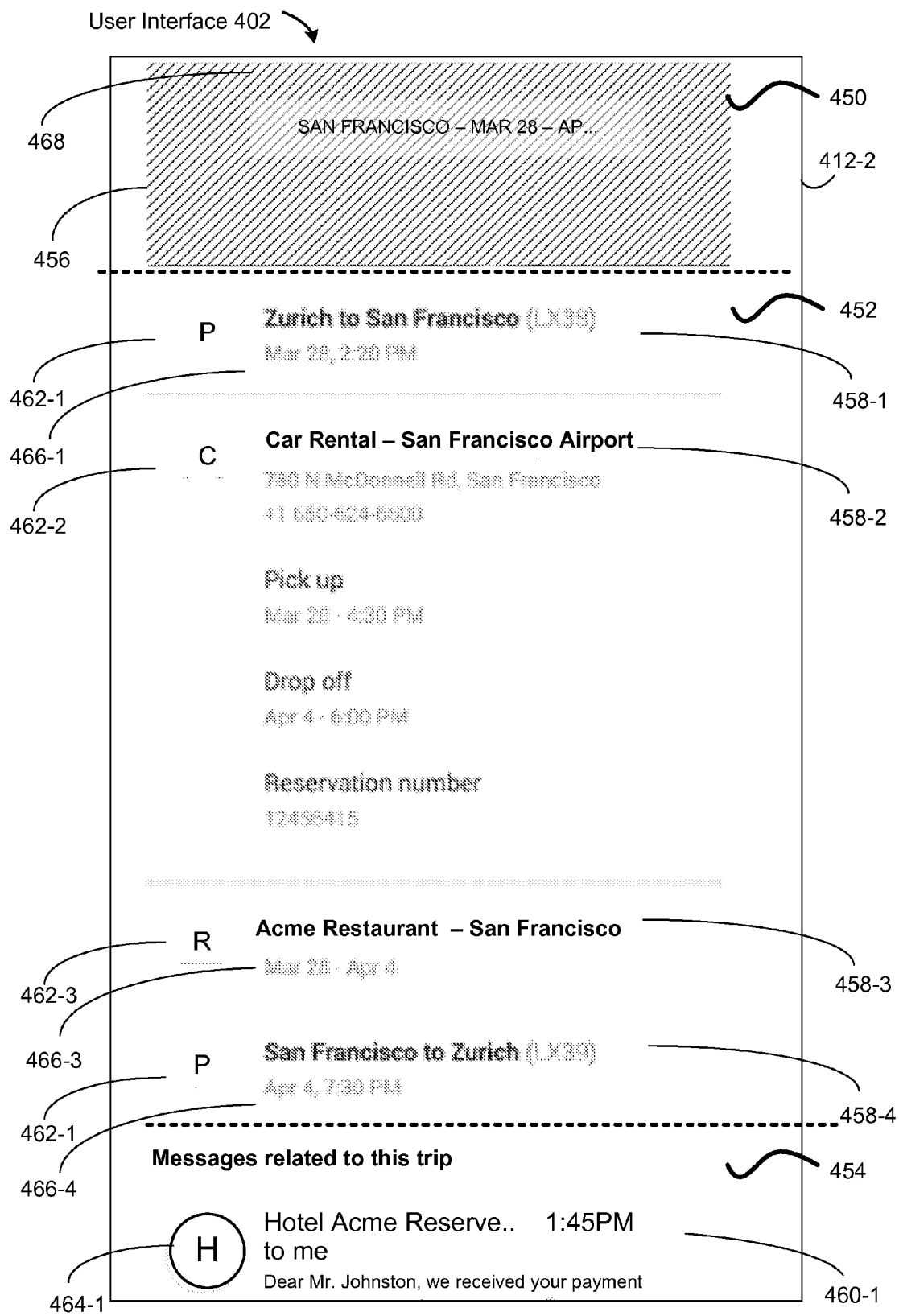

FIG. 4C illustrates how, in some embodiments, a respective event item 458 in the listing of event items can be toggled between a collapsed event state (FIG. 4B) and an expanded state (FIG. 4C), where the expanded state of the respective items provides more information about the respective item than the collapsed state of the respective item.

Referring to FIG. 2, a display device 208 is inherently limited in size. Accordingly, the number of objects displayed in the user interface 402 is necessarily limited. Scrolling may be necessary for a user to get to a desired message. If the number of messages in the message list is small enough, all of the messages may be able to be displayed.

Figure 5A:
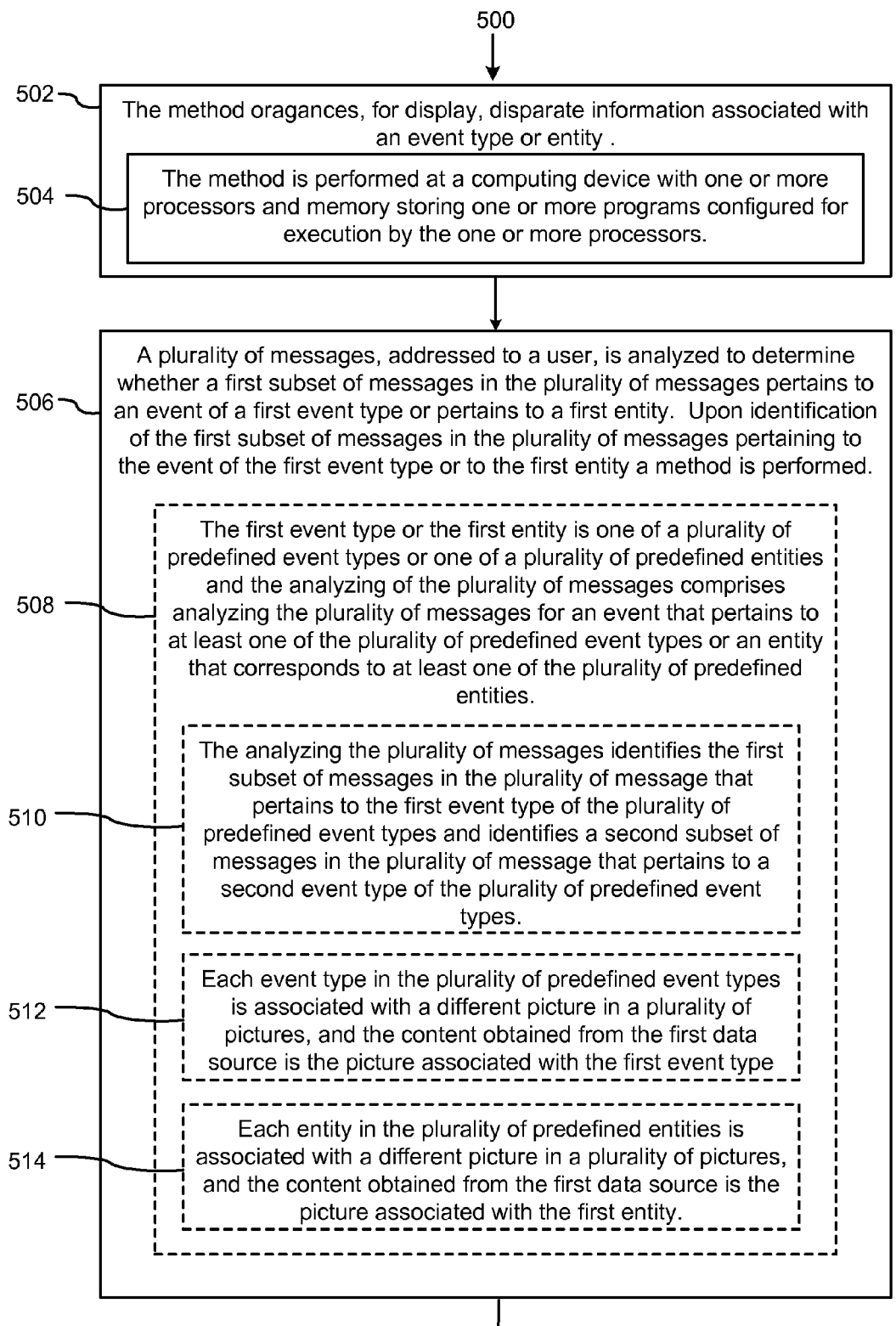
FIGS. 5A-5C provide a flowchart of a process for providing multiple display states for objects representing messages according to some implementations.
Figure 5B:
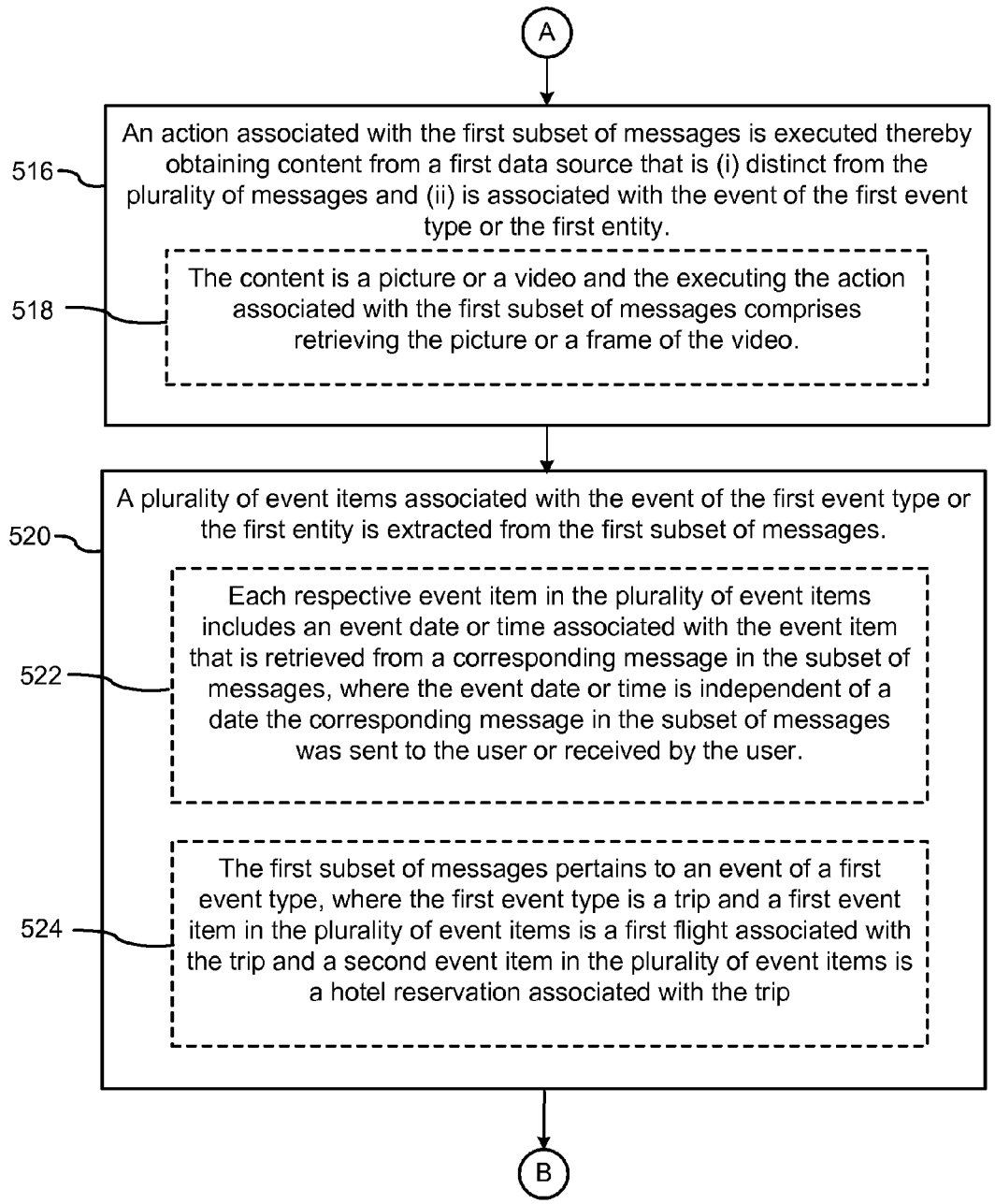
Figure 5C:
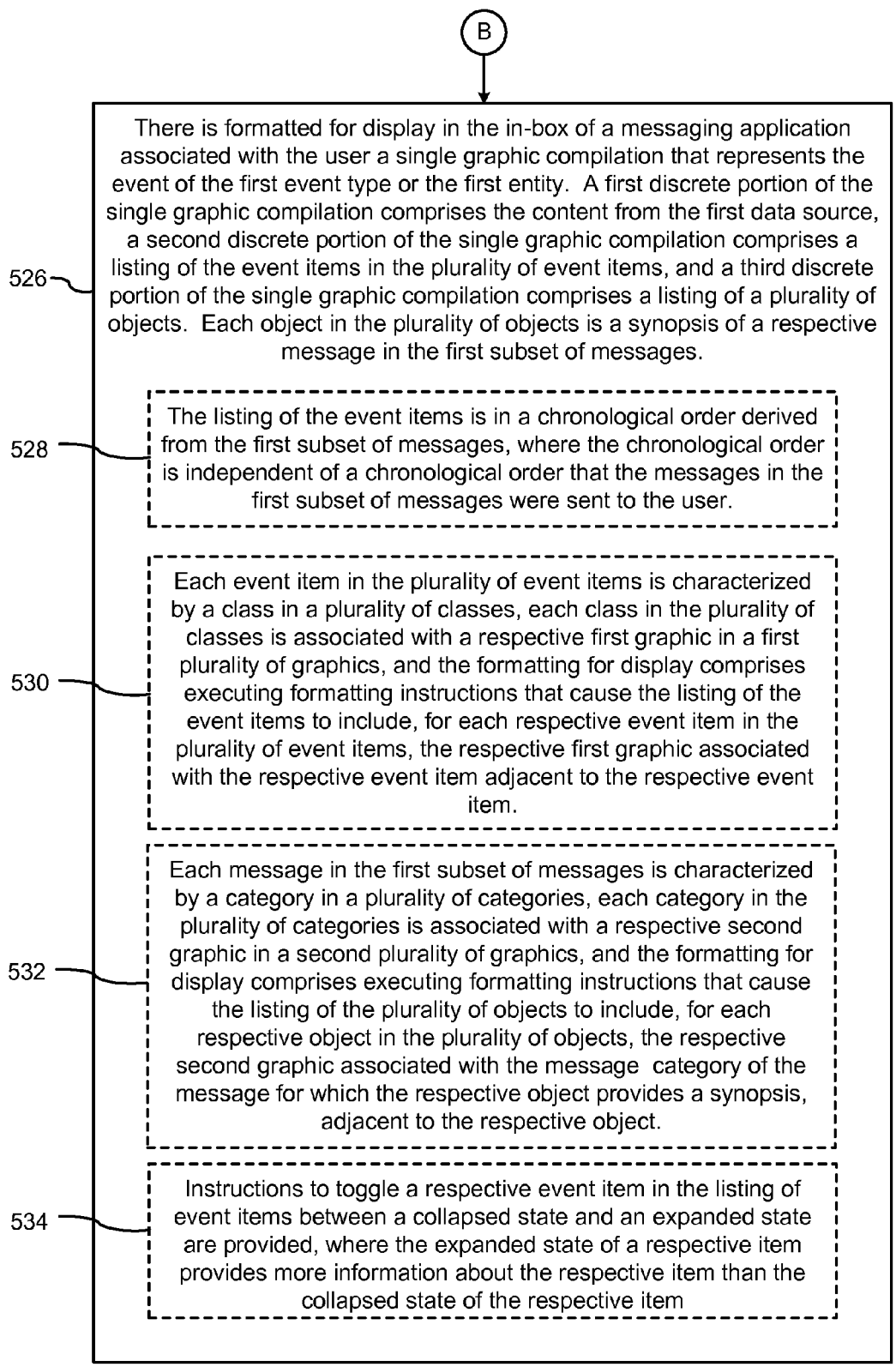

FIGS. 5A-5C provide a flowchart of a process 500, performed by a computing device, for organizing, for display, disparate information associated with an event type or entity (502). The method is performed (504) at a computing device 102 and/or 110 having one or more processors and memory. The memory stores (504) one or more programs configured for execution by the one or more processors.

A plurality of messages, addressed to a user, is analyzed to determine whether a first subset of messages in the plurality of messages pertains to an event of a first event type or pertains to a first entity. Upon identification of the first subset of messages in the plurality of messages pertaining to the event of the first event type or to the first entity a method is performed (506). In some embodiments, the first event type or the first entity is one of a plurality of predefined event types or one of a plurality of predefined entities and the analyzing of the plurality of messages comprises analyzing the plurality of messages for an event that pertains to at least one of the plurality of predefined event types or an entity that corresponds to at least one of the plurality of predefined entities (508). In some embodiments, the analyzing the plurality of messages identifies the first subset of messages in the plurality of message that pertains to the first event type of the plurality of predefined event types and identifies a second subset of messages in the plurality of message that pertains to a second event type of the plurality of predefined event types (510). In some embodiments, each event type in the plurality of predefined event types is associated with a different picture in a plurality of pictures, and the content obtained from the first data source is the picture associated with the first event type (512). In some embodiments, each entity in the plurality of predefined entities is associated with a different picture in a plurality of pictures, and the content obtained from the first data source is the picture associated with the first entity.

In the method, an action associated with the first subset of messages is executed thereby obtaining content from a first data source that is (i) distinct from the plurality of messages and (ii) is associated with the event of the first event type or the first entity (516). In some embodiments, the content is a picture or a video and wherein executing the action associated with the first subset of messages comprises retrieving the picture or a frame of the video (518).

In the method, a plurality of event items associated with the event of the first event type or the first entity is extracted from the first subset of messages (520). In some embodiments, each respective event item in the plurality of event items includes an event date or time associated with the event item that is retrieved from a corresponding message in the subset of messages, where the event date or time is independent of a date the corresponding message in the subset of messages was sent to the user or received by the user (522). In some embodiments, the first subset of messages pertains to an event of a first event type, where the first event type is a trip and a first event item in the plurality of event items is a first flight associated with the trip and a second event item in the plurality of event items is a hotel reservation associated with the trip (524).

In the method, there is formatted for display in the in-box of a messaging application associated with the user a single graphic compilation that represents the event of the first event type or the first entity. A first discrete portion of the single graphic compilation comprises the content from the first data source, a second discrete portion of the single graphic compilation comprises a listing of the event items in the plurality of event items, and a third discrete portion of the single graphic compilation comprises a listing of a plurality of objects. Each object in the plurality of objects is a synopsis of a respective message in the first subset of messages (526). In some embodiments, the listing of the event items is in a chronological order derived from the first subset of messages, wherein the chronological order is independent of a chronological order that the messages in the first subset of messages were sent to the user (528). In some embodiments, each event item in the plurality of event items is characterized by a class in a plurality of classes, each class in the plurality of classes is associated with a respective first graphic in a first plurality of graphics, and the formatting for display comprises executing formatting instructions that cause the listing of the event items to include, for each respective event item in the plurality of event items, the respective first graphic associated with the respective event item adjacent to the respective event item (530). In some embodiments, Each message in the first subset of messages is characterized by a category in a plurality of categories, each category in the plurality of categories is associated with a respective second graphic in a second plurality of graphics, and the formatting for display comprises executing formatting instructions that cause the listing of the plurality of objects to include, for each respective object in the plurality of objects, the respective second graphic associated with the message category of the message for which the respective object provides a synopsis, adjacent to the respective object (532).

In some embodiments, the method further comprises providing instructions to toggle a respective event item in the listing of event items between a collapsed state and an expanded state, wherein the expanded state of the respective item provides more information about the respective item than the collapsed state of the respective item (534).

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations described herein were chosen and described in order to best explain the principles of the invention and its practical applications, to thereby enable others skilled in the art to best utilize the invention and various implementations with various modifications as are suited to the particular use contemplated.

What is claimed is:

1. A method comprising:
at a computing device having one or more processors, a display and memory storing one or more programs for execution by the one or more processors:
executing an electronic messaging application that provides multiple display states for an electronic messaging account associated with a user, including:
analyzing a plurality of messages addressed to the user to determine whether a subset of messages in the plurality of messages pertains to an event;
upon identification of the event associated with the subset of messages:
retrieving content from a data source that is distinct from the plurality of messages and that is associated with the event, wherein the content comprises a visual representation of the event;
extracting a plurality of event items associated with the event from the subset of messages in the plurality of messages; and
providing a user interface for the electronic messaging application, wherein the user interface includes a list of objects, one or more respective objects in the list of objects representing an expanded state of a single graphic compilation corresponding to the event, and wherein the expanded state of the single graphic compilation comprises: (i) a first discrete portion that includes the content retrieved from the data source, (ii) a second discrete portion that includes a list of the event items in the plurality of event items extracted from the subset of messages, and (iii) a third discrete portion that includes a list of objects, each respective object comprising a synopsis of a respective message in the subset of messages.

2. The method of claim 1, wherein the content is a picture or a video.

3. The method of claim 1, wherein the event has a first event type of a plurality of predefined event types.

4. The method of claim 3, wherein analyzing the plurality of messages identifies a second subset of messages in the plurality of messages that pertains to a second event type of the plurality of predefined event types.

5. The method of claim 3, wherein each event type in the plurality of predefined event types is associated with a different picture in a plurality of pictures, and the content retrieved from the data source is the picture associated with the first event type.

6. The method of claim 1, wherein each of the event items has an associated event item date and the event items are chronologically listed in the second discrete portion of the single graphic compilation based on the event item dates.

7. The method of claim 1, wherein:
each event item in the plurality of event items is characterized by a class in a plurality of classes;
each class in the plurality of classes is associated with a respective graphic in a plurality of graphics; and
the list of the event items includes, for each respective event item in the plurality of event items, the respective graphic associated with the respective event item adjacent to the respective event item.

8. The method of claim 7, wherein:
each message in the subset of messages is characterized by a category in a plurality of categories;
each category in the plurality of categories is associated with a respective second graphic in a second plurality of graphics; and
the list of objects includes, for each respective object in the list of objects, the respective second graphic associated with the message category of the message for which the respective object provides a synopsis, adjacent to the respective object.

9. The method of claim 1, wherein each respective event item in the plurality of event items listed in the second discrete portion of the single graphic compilation includes an event date or time associated with the event item, and wherein the event date or time is independent of a transmittal date or time of the corresponding message in the subset of messages from which the event item was extracted.

10. The method of claim 1, wherein the event is a trip, a first event item in the plurality of event items is a first flight associated with the trip, and a second event item in the plurality of event items is a hotel reservation associated with the trip.

11. The method of claim 1, the method further comprising:
responsive to user selection of a predefined area within the expanded state of the single graphic compilation:
replacing the expanded state of the single graphic compilation with a collapsed state of the single graphic compilation by pushing any objects in the list of objects that are above the single graphic compilation down and pushing any objects in the list of objects that are below single graphic compilation up in the user interface;
wherein the collapsed state of the single graphic compilation comprises: (i) a first portion that includes the content retrieved from the data source, and (ii) a second discrete portion that includes a list of the event items in the plurality of event items extracted from the subset of messages.

12. A computing device, comprising:
one or more processors;
memory; and
one or more programs stored in the memory configured for execution by the one or more processors, the one or more programs comprising instructions for:
executing an electronic messaging application that provides multiple display states for an electronic messaging account associated with a user, including:
analyzing a plurality of messages addressed to the user to determine whether a subset of messages in the plurality of messages pertains to an event;
upon identification of the event associated with the subset of messages:
retrieving content from a data source that is distinct from the plurality of messages and that is associated with the event, wherein the content comprises a visual representation of the event;
extracting a plurality of event items associated with the event from the subset of messages in the plurality of messages; and
providing a user interface for the electronic messaging application, wherein the user interface includes a list of objects, one or more respective objects in the list of objects representing an expanded state of a single graphic compilation corresponding to the event, and wherein the expanded state of the single graphic compilation comprises: (i) a first discrete portion that includes the content retrieved from the data source, (ii) a second discrete portion that includes a list of the event items in the plurality of event items extracted from the subset of messages, and (iii) a third discrete portion that includes a list of objects, each respective object comprising a synopsis of a respective message in the first subset of messages.

13. The computing device of claim 12, wherein the content is a picture or a video.

14. The computing device of claim 12, wherein the event has a first event type of a plurality of predefined event types.

15. A non-transitory computer readable storage medium storing one or more programs configured for execution by a computing device having one or more processors and memory, the one or more programs comprising instructions for:
executing an electronic messaging application that provides multiple display states for an electronic messaging account associated with a user, including:
analyzing a plurality of messages addressed to the user to determine whether a subset of messages in the plurality of messages pertains to an event;
upon identification of the event associated with the subset of messages:
retrieving content from a data source that is distinct from the plurality of messages and that is associated with the event, wherein the content comprises a visual representation of the event;
extracting a plurality of event items associated with the event from the subset of messages in the plurality of messages; and
providing a user interface for the electronic messaging application, wherein the user interface includes a list of objects, one or more respective objects in the list of objects representing an expanded state of a single graphic compilation corresponding to the event, and wherein the expanded state of the single graphic compilation comprises: (i) a first discrete portion that includes the content retrieved from the data source, (ii) a second discrete portion that includes a list of the event items in the plurality of event items extracted from the subset of messages, and (iii) a third discrete portion that includes a list of objects, each respective object comprising a synopsis of a respective message in the subset of messages.

16. The non-transitory computer readable storage medium of claim 15, wherein the content is a picture or a video.

17. The non-transitory computer readable storage medium of claim 15, wherein the event has a first event type of a plurality of predefined event types.

18. The non-transitory computer readable storage medium of claim 17, wherein analyzing the plurality of messages identifies a second subset of messages in the plurality of messages that pertains to a second event type of the plurality of predefined event types.

* * * * *

UNITED STATES PATENT AND TRADEMARK OFFICE
CERTIFICATE OF CORRECTION

PATENT NO. : 9,634,976 B2  Page 1 of 1
APPLICATION NO. : 14/473584
DATED : April 25, 2017
INVENTOR(S) : Agarwal et al.

It is certified that error appears in the above-identified patent and that said Letters Patent is hereby corrected as shown below:

In the Claims

Claim 12, Column 18, Line 34, please delete "the first subset" and insert --the subset--.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*